US009228059B2

(12) United States Patent
Boday et al.

(10) Patent No.: US 9,228,059 B2
(45) Date of Patent: *Jan. 5, 2016

(54) PREPARATION OF THIOETHER POLYMERS

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,456

(22) Filed: Dec. 16, 2014

(65) Prior Publication Data

US 2015/0344629 A1 Dec. 3, 2015

Related U.S. Application Data

(63) Continuation of application No. 14/288,300, filed on May 27, 2014.

(51) Int. Cl.
*C08G 75/04* (2006.01)

(52) U.S. Cl.
CPC ...................... *C08G 75/04* (2013.01)

(58) Field of Classification Search
CPC ............................ C08G 75/0268; C08G 75/14
USPC .......................................................... 528/374
See application file for complete search history.

(56) References Cited

U.S. PATENT DOCUMENTS

| 2,889,277 | A | 6/1959 | Hughes |
|---|---|---|---|
| 3,340,232 | A | 9/1967 | Smith et al. |
| 3,598,748 | A | 8/1971 | Hirosawa |
| 3,957,742 | A | 5/1976 | Kveton |
| 4,106,904 | A | 8/1978 | Oude Alink et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,877,451 | A | 10/1989 | Winnik et al. |
| 5,112,796 | A | 5/1992 | Iannicelli |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 2010/0048756 | A1* | 2/2010 | Loccufier et al. ............... 522/10 |
| 2010/0107476 | A1 | 5/2010 | Cosimbescu |
| 2012/0049308 | A1 | 3/2012 | Nishimura et al. |

FOREIGN PATENT DOCUMENTS

| CN | 101265255 A | 9/2008 |
|---|---|---|
| EP | 2636697 A1 | 9/2013 |
| GB | 928112 A | 6/1963 |
| GB | 1531578 A | 11/1978 |
| WO | 0166614 A2 | 9/2001 |
| WO | 0198388 A1 | 12/2001 |
| WO | 0226849 A1 | 4/2002 |

OTHER PUBLICATIONS

U.S. Appl. No. 14/288,300, entitled Preparation of Thioether Polymer, filed May 27, 2014.
Appendix P: List of IBM Patents or Patent Applications Treated as Related, U.S. Appl. No. 14/288,300, May 27, 2014.
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Hydrogen Sulfide Management, Mitigation options in petroleum refining, storage and transportation, White Paper, Baker Hughes, pp. 1-12.
Wang Yulan et al., Synthesis and Properties of Poly-1, 3, 5-Triazines, Polymer Communications, No. 2, 1984, pp. 117-123.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.
Ferrar, "Reactions of Formaldehyde With Aromatic Amines," J. Appl. Chem, 14, 1964, 389-399.
Geng, et al., "Nanoindentation behavior of ultrathin polymeric films," Polymer 46 (2005) 11768-11772; Available online Oct. 19, 2005.
Hiller, et al., "Laser-engravable hexahydrotriazine polymer networks," Mat Res Innovat (2002) 6:179-184.
Oliver, et al. "Measurement of hardness and elastic modulus by; instrumented indentation: Advances in understanding and; refinements to methodology," J. Mater. Res., vol. 19, No. 1, Jan. 2004, 3-20.
Singh, et al., "Ultrasound mediated Green Synthesis of Hexa-hydro Triazines," J. Mater. Environ. Sci. 2 (4) (2011) 403-406.
Stafford, et al., "A buckling-based metrology for measuring; the elastic moduli of polymeric thin films," Nature Materials_Aug. 3, 2004, 545-550;Published online: Jul. 11, 2004.
Ekinci et al., "Preparation, Characterization and H2O2 Selectivity of Hyperbranched Polyimides Containing Triazine", Journal of Polymer Research, 2005, pp. 205-210.

* cited by examiner

*Primary Examiner* — Shane Fang
(74) *Attorney, Agent, or Firm* — Patterson & Sheridan, LLP

(57) ABSTRACT

Polythioethers and methods for forming polythioethers are disclosed herein. The polythioethers are prepared from thiols and hexahydrotriazines. The thiols may be, for example, dithiols, trithiols, monothiols, or mixtures thereof. The polythioethers are prepared from an efficient and simple synthetic method, and the properties of the prepared polythioethers can be readily tuned. The prepared polythioethers may additionally have improved thermal properties, improved mechanical properties, and enhanced functionality.

8 Claims, 2 Drawing Sheets

PREPARATION OF THIOETHER POLYMERS

CROSS-REFERENCE TO RELATED APPLICATIONS

This application is a continuation of co-pending U.S. patent application Ser. No. 14/288,300, filed May 27, 2014. The aforementioned related patent application is herein incorporated by reference in its entirety.

INCORPORATION BY REFERENCE

The inventors herein incorporate by reference IBM Docket ARC920130049US1, application Ser. No. 14/050,995, filed in the USPTO on Oct. 10, 2013.

BACKGROUND

The present disclosure relates to polythioethers, and more specifically, to polythioethers prepared from hexahydrotriazines and thiols.

Polythioethers are commercially significant for example, because polythioethers generally high flexibility at low temperatures and fuel resistance. Polythioethers are commercially applied as adhesives and as scavengers for heavy metal ions. However, many methods of forming polythioethers result in low yields and do not allow for widely tunable properties. Additionally, many polythioethers lack tailorable functionalities.

A need exists for improved polythioethers and an improved method for forming the same.

SUMMARY

According to one embodiment of the present disclosure, a class of polythioethers having the following repeat unit is disclosed.

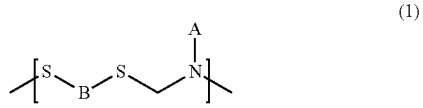
(1)

In the disclosed polythioether, A is a substituted or unsubstituted alkane group, a substituted or unsubstituted alkene group, a substituted or unsubstituted alkyne group, a substituted or unsubstituted aromatic group, or a substituted or unsubstituted heterocyclic group. In the disclosed polythioether, B is an alkane group, an aromatic group, an ether group, a thioether group, or a ketone group.

According to another embodiment of the present disclosure, a method of forming a polythioether having the following general formula is disclosed.

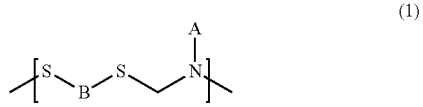
(1)

The method includes reacting a first hexahydrotriazine having the general formula

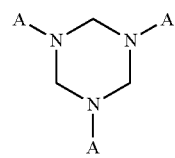
(2)

with a first dithiol having the general formula

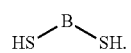
(3)

In the disclosed method, A is a substituted or unsubstituted alkane group, a substituted or unsubstituted alkene group, a substituted or unsubstituted alkyne group, a substituted or unsubstituted aromatic group, or a substituted or unsubstituted heterocyclic group. In the first dithiol, B is an alkane group, an aromatic group, an ether group, a thioether group, or a ketone group.

DETAILED DESCRIPTION

Figure 1:
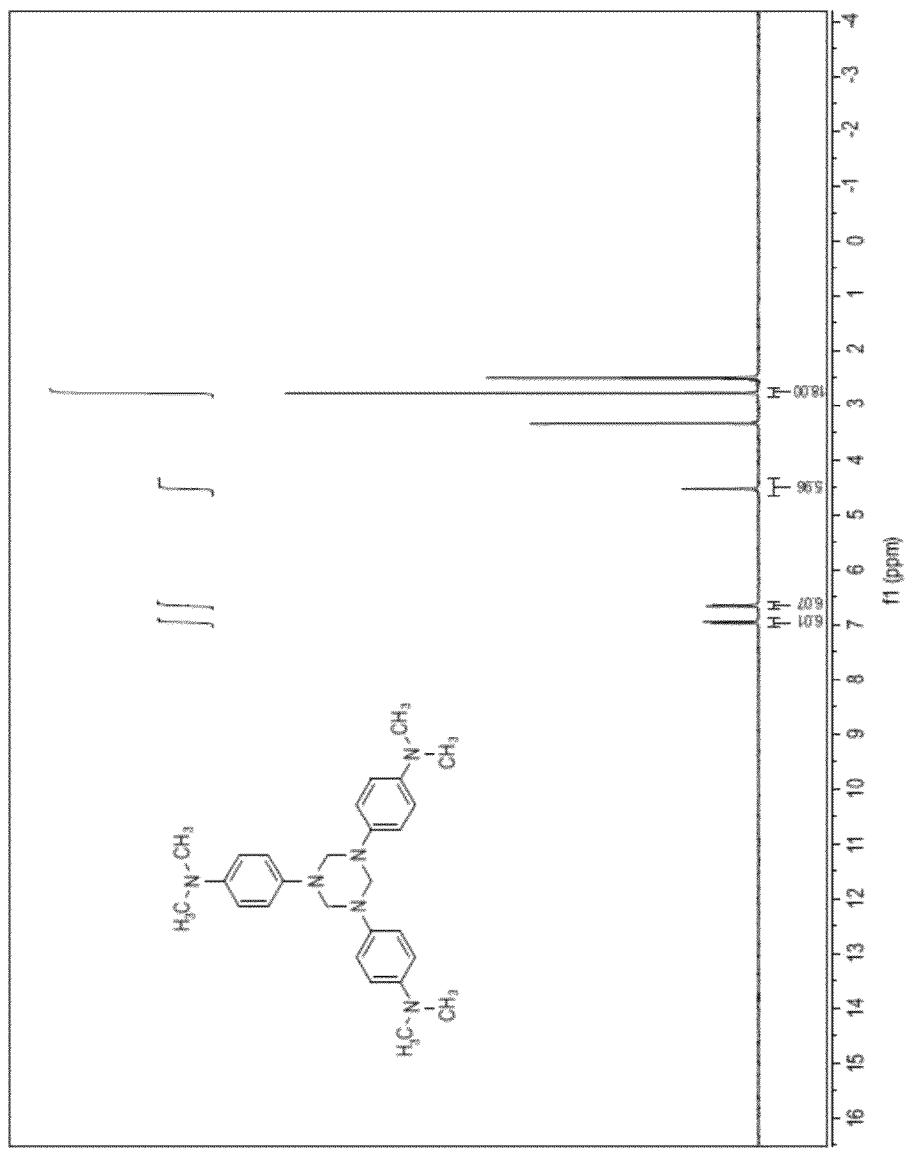
FIG. 1 is a $^1$H NMR spectrum of purified 4,4',4''-(1,3,5-triyl)tris(N,N-dimethylaniline) (Example 1).

Polythioethers and methods for preparing polythioethers from hexahydrotriazines and thiols are disclosed herein. More specifically, polythioethers comprising a repeat unit of the general formula (1) are disclosed.

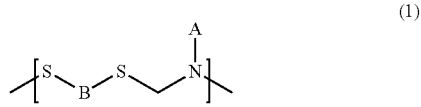
(1)

Monomers:

Hexahydrotriazines that may be used to form polythioethers of the general formula (1) may have the general formula (2).

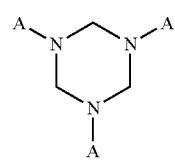
(2)

As shown in general formula (1), the A moiety is incorporated into the repeat unit of the polythioether. The A moiety can be broadly varied, allowing for broad tailoring of the properties of the resulting polythioethers. In some embodiments, each A moiety may be the same or different. The A moiety may be a substituted or unsubstituted alkane group, a substituted or unsubstituted alkene group, a substituted or unsubstituted alkyne group, a substituted or unsubstituted aromatic group, or a substituted or unsubstituted heterocyclic group.

In embodiments where the A moiety is an alkane group, and alkene group, or an alkyne group, A may be linear, branched, or cyclic. The alkane, alkene, or alkyne groups may contain any number of carbon atoms. For example, the groups may contain between about 1 and about 10 carbon atoms, such as between about 1 and about 6 carbon atoms. The alkane, alkene, or alkyne groups may be substituted. For example, the alkane, alkene, or alkyne groups may contain carbon-halogen bonds. In embodiments including carbon-halogen bonds, the alkane, alkene, or alkyne groups may contain one or more bonds to one or more of fluorine, bromine, chlorine, or iodine. In other embodiments, the alkane, alkene, or alkyne groups may be substituted with one or more functional groups selected from the group consisting of aromatic groups, heterocyclic groups, amide groups, ether groups, alcohol groups, aldehyde groups, ketone groups, ester groups, and carboxylic acid groups.

In embodiments where the A moiety is aromatic, the A moiety may be, for example, an aryl group, such as a phenyl or naphthyl group. The aromatic group may be substituted with one or more functional groups. For example, the aromatic group may be substituted with one or more functional groups selected from the group consisting of alkane groups, alkene groups, alkyne groups, aromatic groups, heterocyclic groups, amide groups, ether groups, alcohol groups, aldehyde groups, ketone groups, ester groups, and carboxylic acid groups. These functional groups may provide cross-linking, improved adhesion, improved mechanical properties, improved thermal properties, and other improved properties. The substituent group may be positioned at the ortho, meta, or para position relative to the hexahydrotriazine ring. In one embodiment, the A moiety may be aniline or a substituted aniline, such as an N-substituted aniline. For example, in one embodiment, the A moiety may be N,N-dimethylaniline, and the structural formula of the hexahydrotriazine may be as follows:

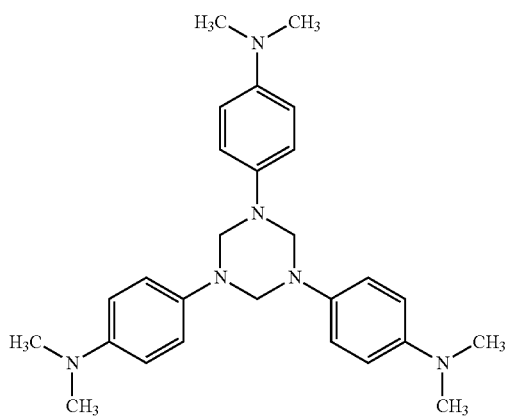

As shown above, the —[N(CH$_3$)$_2$] groups are in the para position relative to the hexahydrotriazine ring. In other embodiments, the —[N(CH$_3$)$_2$] groups may be in the ortho or meta position. In other embodiments, the A moiety may be N-methylaniline, aniline, phenol, cresol, halophenol, toluene, xylene, or others.

In still other embodiments, an aromatic A moiety may be a heteroaromatic group. The heteroatom may include one or more atoms selected from the group consisting of oxygen, nitrogen, and sulfur. Representative heteroaromatic groups include pyrrole, furan, thiophene, imidazole, pyrazole, oxazole, isoxazole, thiazole, isothiazole, pyridine, pyran, or thiopyran.

In embodiments where the A moiety is a heterocyclic group, the heterocyclic group may contain one or more atoms selected from the group consisting of nitrogen, oxygen, and sulfur. Representative heterocyclic groups include oxirane, tetrahydrofuran, tetrahydropyran, maleic anhydride, pyrrolidine, imidazolidine, pyrazolidine, piperidine, thiolane and thiane. The heterocyclic group may also be substituted. For example, the heterocyclic group may be substituted with one or more functional groups selected from the group consisting of alkane groups, alkene groups, alkyne groups, aromatic groups, heterocyclic groups, amide groups, ether groups, alcohol groups, aldehyde groups, ketone groups, ester groups, and carboxylic acid groups.

Dithiols that may be used to form polythioethers of general formula (1) may have the general formula (3).

(3)

As shown in the general formula (1), the B moiety is incorporated into the repeat unit of the polythioether. The B moiety can be broadly varied, allowing for broad tailoring of the properties of the resulting polythioethers. The B moiety may an alkane group, an aromatic group, an ether group, a thioether group, or a ketone group.

In embodiments where the B moiety is an alkane group, the alkane group may be linear, branched, or cyclic. The alkane group may contain any number of carbon atoms. For example, the alkane group may contain between about 1 and about 16 carbon atoms, such as between about 1 and about 10 carbon atoms. In some embodiments, the alkane group contains between about 4 and about 8 carbon atoms. In some embodiments, the alkane group contains 6 carbon atoms and is linear. In some embodiments, the alkane group contains 6 carbon atoms, is linear, and is non-substituted.

In embodiments where the B moiety is an alkane group, the alkane group may be substituted. For example, the alkane group may be substituted with one or more functional groups selected from the group consisting of amine groups, trialkoxysilane groups, alcohol groups, alkene groups, alkyne groups, cyanate groups, isocyanate groups, carboxylic acid groups, ester groups, and phenolic groups.

In some embodiments, the B moiety has the general formula (4).

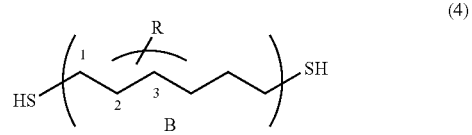

(4)

As indicated in the formula (4), a thiol group bonds to each terminal carbon of the B moiety. As shown above, an R group may be attached to any carbon in the chain. For example, the R group may be attached to the labeled 1, 2, or 3 carbon. In the general formula (4), R may be —H, —NH₃, —OH, —CO₂H, or —CO₂R'. In other embodiments, R may be:

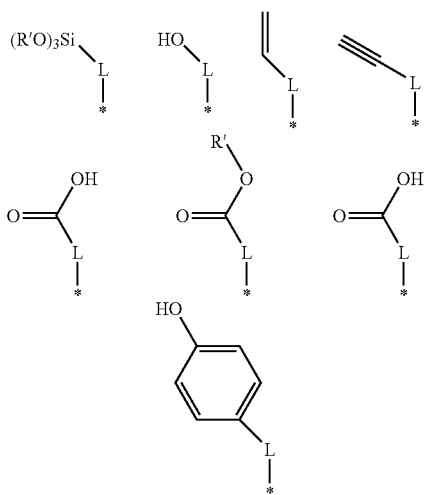

The * indicates the location on the R group where the R group bonds to the B moiety. L may be a linear, branched, or cyclic alkane group. In some embodiments, L may have between 1 and about 10 carbon atoms. For example, L may have between about 1 and about 6 carbon atoms. In some embodiments, L has 4 carbon atoms. R' may be a linear, branched, or cyclic alkane group. In some embodiments, R' may have between about 1 and about 4 carbon atoms. In some embodiments, R' has 2 carbon atoms. In other embodiments, an R group may be present on more than one carbon atom.

In embodiments where the B moiety is aromatic, the aromatic moiety may be, for example, an aryl group, such as a phenyl or naphthyl group. The aryl group may be substituted with one or more functional groups. For example, the aryl group may be substituted with one or more functional groups selected from the group consisting of alkane groups, alkene groups, alkyne groups, aromatic groups, heterocyclic groups, amide groups, ether groups, alcohol groups, aldehyde groups, ketone groups, ester groups, and carboxylic acid groups. In embodiments where the B moiety is an aromatic group, the resulting polythioether may be expected to have improved mechanical and thermal properties.

In embodiments where the B moiety is an ether group, a ketone group, or a thioether group, the B moiety may have the general formula (5).

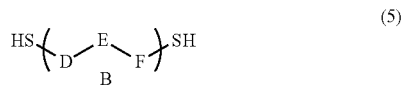

(5)

As indicated in the formula (5), a thiol group bonds to the terminal end of the D moiety and the terminal end of the F moiety. The E moiety may correspond to the —O— of an ether group, the >C=O of a ketone group, or the —S— of a thioether group. The D moiety and the F moiety may be alkane or aromatic. The alkane groups may be linear, branched, or cyclic. The aromatic group may be an aryl group, such as a phenyl group, and may be substituted or unsubstituted. The ether group, ketone group, or thioether group may be symmetrical or asymmetrical. In symmetrical embodiments, the D moiety and the F moiety are identical. In asymmetrical embodiments, the D and the F moieties are different.

Representative embodiments where B is an ether group, a thioether group, or a ketone group are shown below.

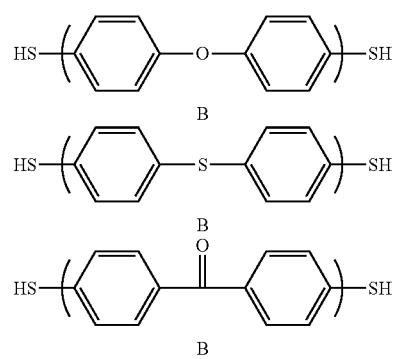

In some embodiments, a trithiol of the general formula (6) may be used to form the polythioethers.

(6)

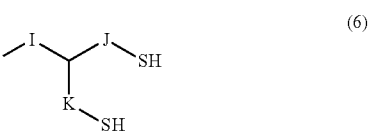

The trithiol may be used to form a cross-linked polythioether. A crosslinked polythioether may be more readily fabricated into a film and may have excellent mechanical and thermal properties. The I, J, and K moieties may be any moiety suitable for moiety B.

In some embodiments, a monothiol of the general formula (7) may also be used to form the polythioethers.

$$E \diagup SH \quad (7)$$

The E moiety may be any group suitable for the B moiety. The E moiety can be added to the polymerization reaction mixture in order to control the molecular weight or to provide end-capping functionalization. In some embodiments, the E moiety may include 2 or more reactive functional groups to allow for cross-linking. An E moiety with 2 or more reactive functional groups may assist in forming films from the polythioether.

Polymers and Polymerization

Polythioethers of the general formula (1) may be prepared by reacting: [1] thiols of the formulas (3), (4), (5), and/or (6) with [2] hexahydrotriazines of the formula (2). The polymerization reaction may be, for example, a condensation polymerization reaction. In embodiments including trithiols of the formula (6) and dithiols of the formulas (3), (4), and/or (5), the molar ratio of dithiols to trithiols may be between about 1:1 and about 100:1, such as between about 1:1 and about 10:1, such as between about 1:1 and about 4:1. Optionally, the polymerization reaction may include monothiols of the general formula (7). In embodiments using monothiols of the general formula (7), the ratio of the combined moles of dithiol and trithiol to the moles of monothiol may be between about 10:1 and about 100:1, such as between about 50:1 and about 100:1. The ratio of the combined moles of thiol functional groups present in the thiols of formulas (3), (4), (5), (6), and (7) to moles of hexahydrotriazines with the general formula (2) may range from about 1.8:1 to about 2.1:1, such as about 2:1. In other embodiments, the ratio may be about 2.1:1. In other embodiments, the ratio may be between about 0.9:1 and about 1.1:1, such as about 1:1. In other embodiments, the ratio was between about 1:1 and about 2:1. In embodiments where the ratio is greater than 2:1, the polymerization reaction may result in a crosslinked network. The number average molecular weight ($M_n$) of the resulting polymers may be between about 1000 g/mol and about 25,000 g/mol. In other embodiments, the $M_n$ may be greater than 25,000 g/mol.

In embodiments including dithiols of the formula (3) to prepare polythioethers of the formula (1), each B moiety may be the same. Alternatively, some of the B moieties may be different from other of the B moieties. In embodiments where the B moieties differ, the polythioether may be a copolymer. In an embodiment including two distinct B moieties, the polythioether may be represented by general formula (8).

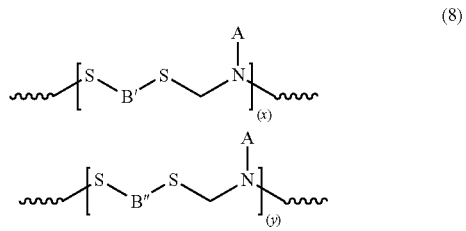

(8)

B' and B" represent the two distinct B moieties. The copolymer of formula (8) may be an alternating copolymer, periodic copolymer, statistical copolymer, random copolymer, block copolymer, linear copolymer, branched copolymer, or other type of copolymer. The ratio of x:y may be from between about 1:99 to about 99:1. In other embodiments, more than two distinct B moieties may be used.

The R moieties of the dithiols of the formula (4) may be the same in each molecule or may differ from molecule to molecule. Also likewise, the use of differing R moieties may result in a copolymer of formula (8). Using a variety of B or R moieties allows for further tailoring of the properties of the resulting polythioether of the general formula (1). Similarly, the E moieties of the monothiols of the general formula (7) may be the same in each molecule or may differ from molecule to molecule. Likewise, the I, J, and K moieties of the trithiols of the general formula (6) may be the same in each molecule or may differ from molecule to molecule.

The A moieties in the hexahydrotriazines of the general formula (2) may be the same in each hexahydrotriazine molecule. For example, in each hexahydrotriazine molecule, the A moiety may be dimethylaniline. Alternatively, the A moieties in some of the molecules of hexahydrotriazines of the general formula (2) may differ from other molecules. In embodiments where the A moieties differ, the polythioether may be a copolymer. In an embodiment including two distinct A moieties, the polythioether may be represented by general formula (9).

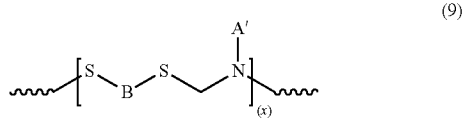

(9)

-continued

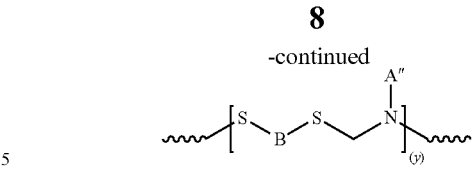

A' and A" represent the two distinct A moieties. The copolymer of formula (9) may be an alternating copolymer, periodic copolymer, statistical copolymer, block copolymer, linear copolymer, branched copolymer, or other type of copolymer. Using a variety of differing moieties allows for further tailoring of the properties of the resulting polythioether of the general formula (1). The ratio of x:y may be from between about 1:99 to about 99:1. In other embodiments, more than two distinct A moieties are used. In some embodiments, more than one distinct A moiety is used and more than one distinct B moiety is used, resulting in a polymer with four distinct repeat units.

Representative reaction conditions for a condensation polymerization of the polythioether of the formula (1) from the above thiols include the following. The polymerization may be carried out at a temperature of between about −50° C. and about 150° C., such as between about 25° C. and about 30° C. The reaction may be performed under an inert atmosphere, such as a nitrogen or argon atmosphere. In embodiments where the thiols and the hexahydrotriazines are soluble or miscible in each other, a solvent may optionally be used. In other embodiments, the reaction may be carried out in any suitable solvent, for example chloroform or similar solvent. The polymerization may proceed for any suitable period of time, for example between about 1 hour and about 18 hours. The polymer may be isolated from solution by any suitable method or methods, for example, filtration, vacuum distillation, and precipitation. The above conditions represent only typical conditions. For example, some embodiments may include polymerization temperatures outside of the above-provided temperature ranges and polymerization times outside of the above-provided time ranges. Specific examples of a condensation polymerization are discussed below.

The previously described embodiments have many advantages, including the following. The methods of forming the polythioethers result in high yields and are easily performed. These methods allow for forming polythioethers with widely differing properties and thus allow polymer chemists to select or "tune" the properties of the resultant polymers according to end-use applications. Additionally, the polythioethers may have desirable viscosity properties. For example, the viscosity of the polythioethers may be readily modified based on the monomers used to prepare the polymer. Furthermore, the polythioether may be added to other materials to modify the viscosity of the other materials. In addition, the polythioethers may be selectively degradable. Moreover, the polythioethers may have anti-microbial properties and elastomeric properties. Additionally, the polythioethers may be easily applied as coatings. The aforementioned advantages are illustrative and not limiting. It is not necessary for all embodiments to have all the advantages.

Representative Preparation of a Hexahydrotriazine Compound

Example 1

Reaction of Aniline with Paraformaldehyde to Form the Hexahydrotriazine Compound 4,4',4"-(1,3,5-triazinane-1,3,5-triyl)tris(N,Ndimethylaniline) (HTPT)

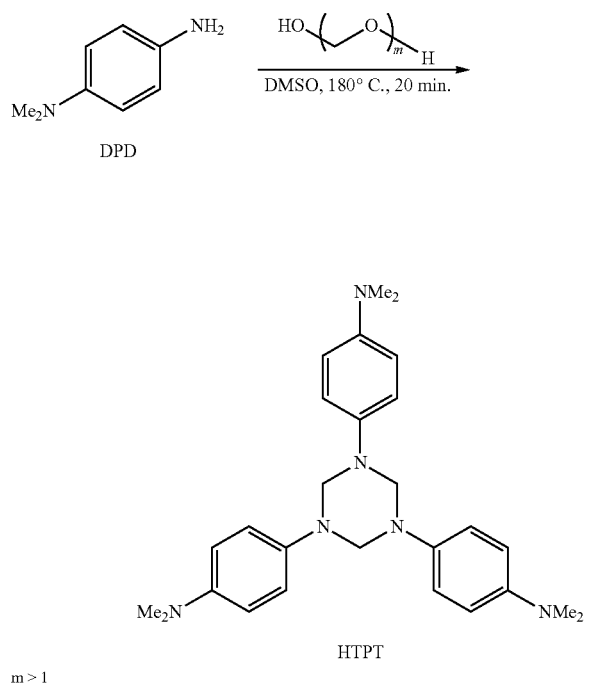

N,N-dimethyl-p-phenylenediamine (DPD, 0.21 g, 0.15 mmol) and paraformaldehyde (PF, 0.0046 g, 0.15 mmol, 1 equivalent (eq.)) were weighed out into a 2-Dram vial inside a glovebox. Dimethylsulfoxide (DMSO) (0.91 g, 1.0 mL) was added to the vial. The reaction mixture was removed from the glovebox and heated in an oil bath at 180° C. for 20 minutes. The DMSO was removed in vacuo and 4,4',4"-(1,3,5-triazinane-1,3,5-triyl)tris(N,N-dimethylaniline) was collected as a brown solid (0.04 g, 79% yield).

The purified HTPT has a singlet resonating at delta 4.5 ppm (FIG. 1, $^1$H NMR spectrum) for the six methylene protons of HTPT. $^1$H NMR (d$_6$-DMSO, 400 MHz): delta 6.97 (d, 2H, J=8 Hz), 6.66 (d, 2H, J=8 Hz), 4.53 (s, 2H), 2.78 (s, 6H) ppm.

Thiols

Various dithiols corresponding to the general formulas (3), (4), and/or (5), trithiols corresponding to the general formula (6), and monothiols corresponding to the general formula (7) are commercially available from several manufactures, such as Fisher Scientific of Hampton, N.H., Sigma-Aldrich of St. Louis, Mo., or these components may be otherwise synthesized according to known procedures.

Polymerization of Thiols to Form Polythioethers

Example 2

Polymerization of HTPT with 1,6-hexanedithiol

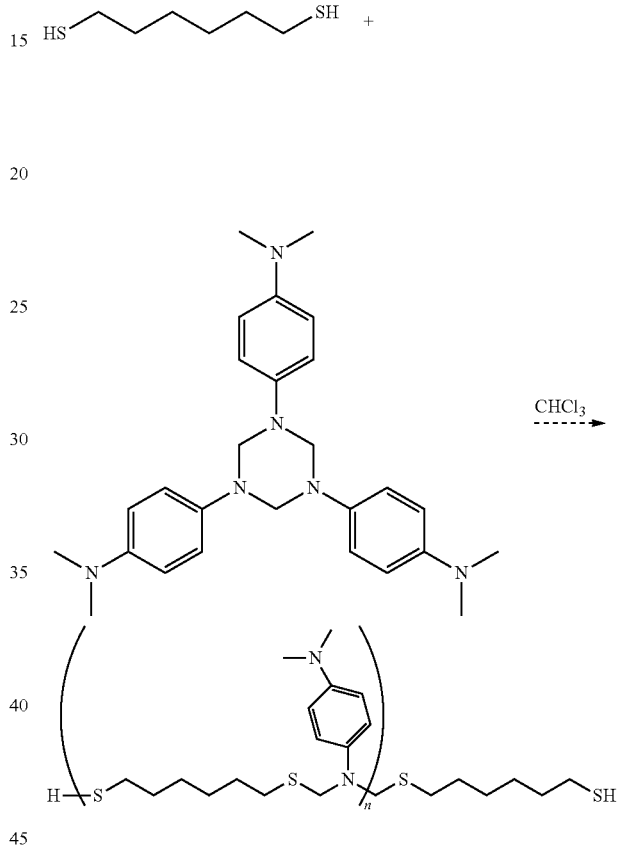

200 mg of the triazine (0.45 mmol) and 69 μL of hexane dithiol was added to a 10 mL round bottom flask. A stir bar was added followed by 3 mL of chloroform to bring the concentration of the triazine to 150 mM. The resulting solution was reacted under nitrogen over the course of 18 hrs.

Figure 2:
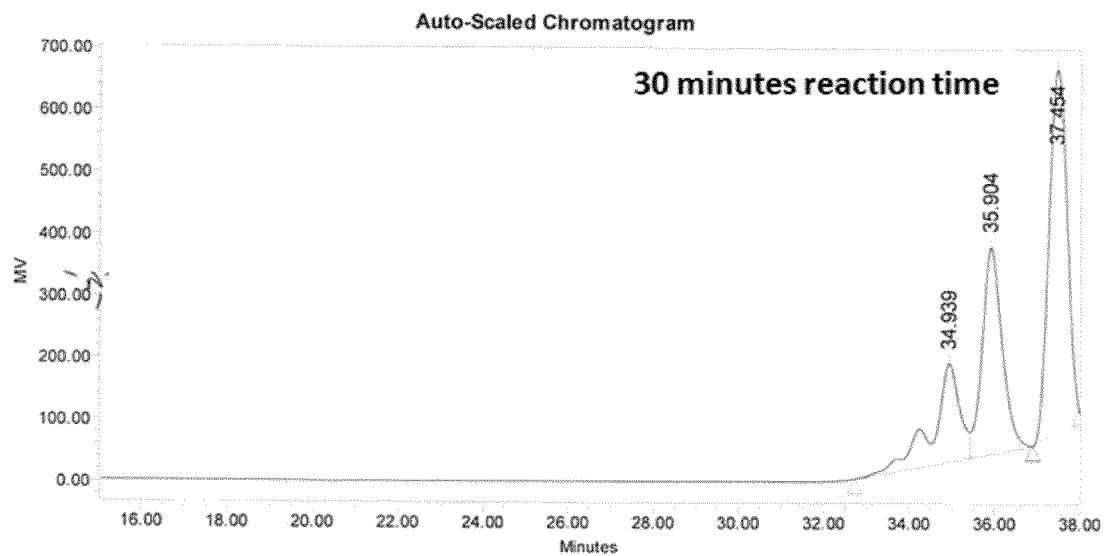
FIG. 2 is a gel permeation chromatography (GPC) spectrum of a representative polythioether (Example 2).

FIG. 2 illustrates a gel permeation chromatography (GPC) run used to characterize the polythioether of Example 2. The M$_w$ of the polythioether of Example 2 was approximated to be about 1200 g/mol.

Figure 3:
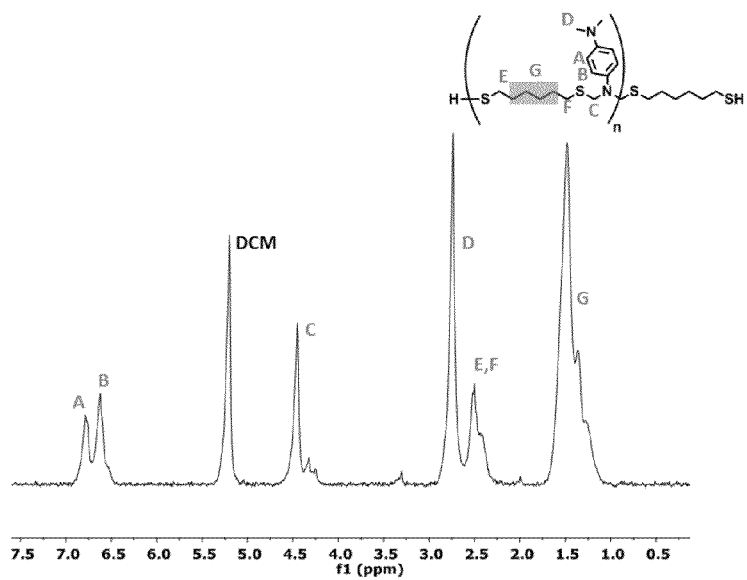
FIG. 3 is a $^1$H NMR spectrum of a representative polythioether (Example 2).

FIG. 3 illustrates a $^1$H NMR for the polythioether of Example 2. The purified polythioether has a singlet resonating at delta 6.8 ppm corresponding to the two protons A shown in FIG. 3, a singlet resonating at delta 6.6 corresponding to the two protons B shown in FIG. 3, a singlet resonating at delta 4.4 corresponding the two protons C shown in FIG. 3, a singlet resonating at delta 2.7 corresponding to the six protons D shown in FIG. 3, a multiplet resonating at from about 2.3 to about 2.6 corresponding to the two protons E and the two protons F shown in FIG. 3, a multiplet resonating at a delta from about 1.3 to about 1.6 corresponding the eight protons G shown in FIG. 3. Significant peak broadening, a characteristic of stepwise polymerizations, is also observed in the ¹H NMR spectrum.

Example 3

Polymerization of 1,3,5-trimethyl-1,3,5-triazinane with 1,6-hexanedithiol

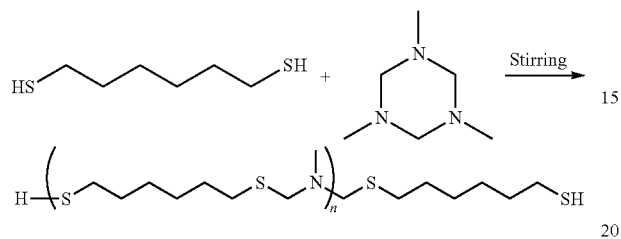

1 mL of the triazine (7.1 mmol) was added to a 20 mL vial with screw cap top followed by 1.284 mL of hexane dithiol (1eq.). A stir bar was added and nitrogen was blown into the reaction vial, and the vial was then sealed with the screw cap. The reaction was stirred at room temperature (ca. 25° C.) for a period of 18 hrs. The solution was noted to transform from a liquid material to an extremely viscous material overnight. This same reaction was also attempted with 2 eq. of dithiol (2.26 mL) under the same reaction conditions. Again a significant increase in viscosity was noted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming a polythioether having the repeat unit

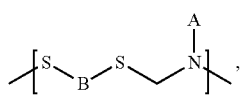

the method comprising:
reacting a first hexahydrotriazine of the general formula

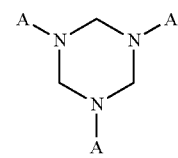

with a first dithiol having the general formula

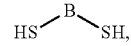

wherein each A is independently selected from a substituted or unsubstituted alkane group, a substituted or unsubstituted alkene group, a substituted or unsubstituted alkyne group, a substituted or unsubstituted aromatic group, or a substituted or unsubstituted heterocyclic group, and wherein each B is an alkane group, an aromatic group, an ether group, a thioether group, or a ketone group.

2. The method of claim 1, wherein B comprises

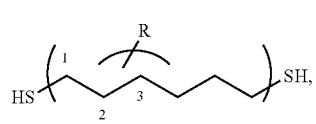

wherein R is bonded to the 2 or 3 carbon, and wherein R is selected from the group consisting of:

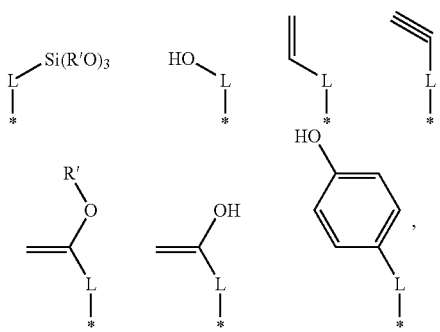

wherein R' comprises an alkane group, L comprises an alkane group, and wherein * indicates the location on the R where R bonds to the B.

3. The method of claim 2, wherein A is selected from the group consisting of substituted and unsubstituted alkane groups and substituted and unsubstituted aromatic groups.

4. The method of claim 3, further comprising reacting the first hexahydrotriazine and first dithiol with a trithiol.

5. The method of claim 3, further comprising reacting the first hexahydrotriazine and first dithiol with a monothiol.

6. The method of claim 3, further comprising reacting the hexahydrotriazine and dithiol with a second hexahydrotriazine, wherein the second hexahydrotriazine is distinct from the first hexahydrotriazine.

7. The method of claim 3, further comprising reacting the hexahydrotriazine and dithiol with a second dithiol, wherein the second dithiol is distinct from the first dithiol.

8. The method of claim 3, wherein A comprises an N,N-dimethylaniline group.

* * * * *